Patented Oct. 20, 1936

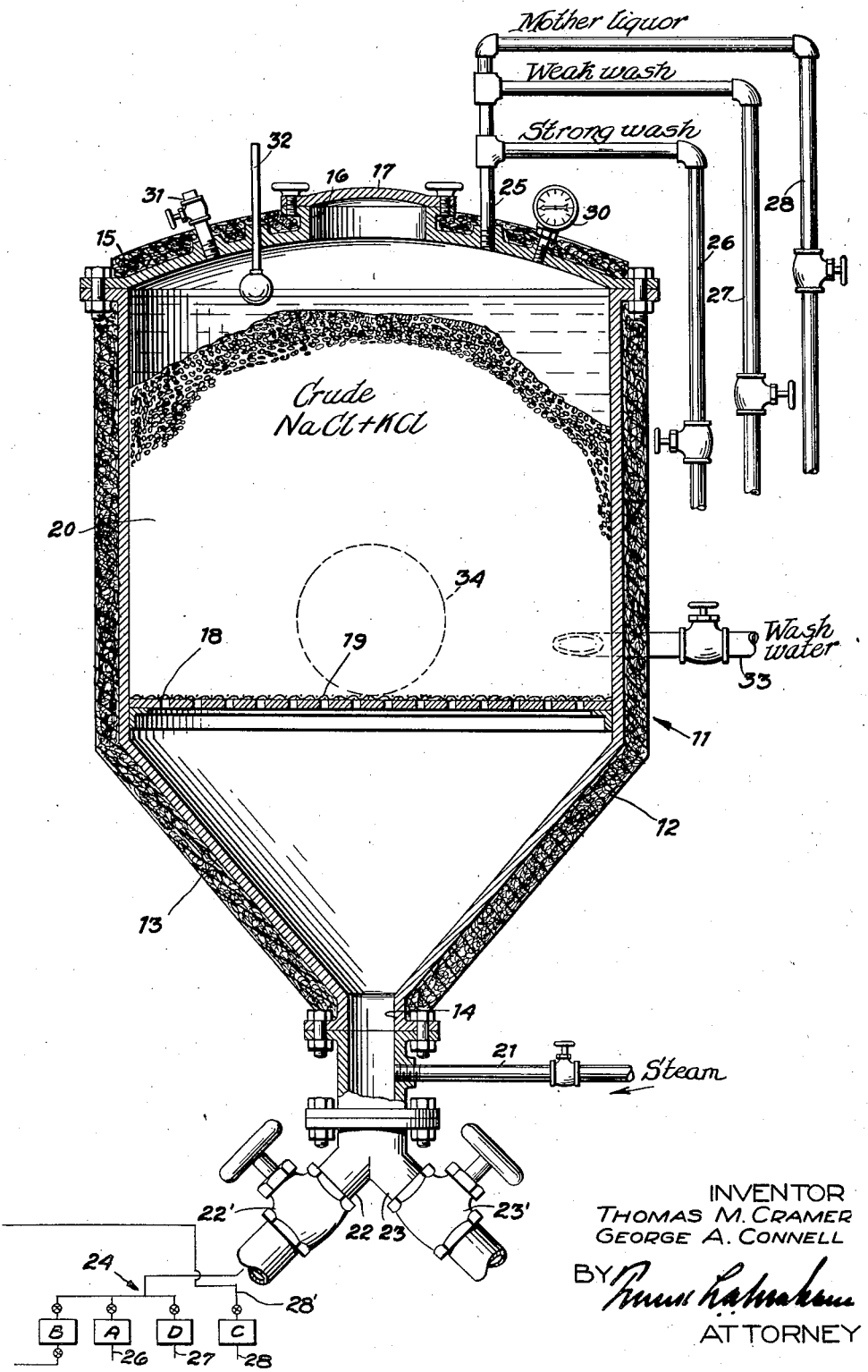

2,058,300

UNITED STATES PATENT OFFICE 2,058,300

PROCESS FOR EXTRACTING POTASH SALTS FROM CRUDE SALTS

Thomas M. Cramer, Carlsbad, N. Mex., and George A. Connell, San Pedro, Calif., assignors to Pacific Coast Borax Co., a corporation of Nevada Application November 3, 1933, Serial No. 696,510
Renewed March 17, 1936

3 Claims. (Cl. 23—268)

This invention has to do in a general way with the art of recovering a pure salt from naturally occurring mineral deposits containing the said salt in crude form and in admixture with another salt or salts and gangue material.

More specifically the process contemplated by this invention was developed for the purpose of recovering pure potassium chloride (KCl) from a naturally occurring deposit such as is found near Carlsbad, New Mexico, where the potassium chloride occurs in admixture with sodium chloride (NaCl) and gangue material.

It is a primary object of this invention to produce a process of the class described which can be practiced with a very high rate of extraction and in which the process steps involved in extracting and recovering pure potassium chloride from a mineral and salt mixture of the type hereinabove referred to are reduced to a minimum.

It becomes a further object of our invention to provide a process of the class described wherein the filtration step, ordinarily employed to clarify a strong liquor or extracted solution, is combined with the extracting step thereby eliminating filtration as a separate process operation.

The process contemplated by our invention, therefore, consists broadly in passing a solvent liquid through a body of the salt and ganuge mixture and utilizing the gangue, and the salt or salts which are insoluble in the solvent liquid under the conditions of treatment, as a natural filter bed to clarify the solution containing the dissolved potassium chloride.

In the development of our process, we have discovered that several features of operation and control are extremely important to the obtainment of satisfactory results.

In the first place, it is necessary that the solvent liquid, whether it be water or a mother liquor, must be hot so that potassium chloride can be recovered from a saturated solution by a subsequent cooling step. Inasmuch as sodium chloride has substantially the same solubility in both hot and cold water and potassium chloride is much more soluble in hot solution than in cold, it will be seen that the extracted solution, which in the case of a salt mixture contains both NaCl and KCl, can be cooled to precipitate KCl without precipitating NaCl or at most precipitating only a negligible amount of NaCl so that the recovery of a commercial product can be effected simply by extracting with hot solution and then cooling the solution to precipitate the KCl.

In our initial work in the development of this process, we attempted to effect the extraction simply by passing hot water or hot mother liquor through a body of the salt and gangue mixture, such body being at atmospheric temperature. It was found, however, that the flow rate through such a body of material was in the neighborhood of only twenty (20) gallons per minute which was far too low for satisfactory operation on a commercial scale.

Attempts to stir or agitate the solution resulted in the solution being contaminated with foreign material from the gangue which would necessitate a filtration step.

After considerable experimental work, we discovered that if the body of salt and gangue mixture were thoroughly heated, such as for example, by steaming at substantially atmospheric pressure for a period of from 25 to 45 minutes, the flow rate of the extracting solution therethrough was raised from 20 gallons per minute to 210 gallons per minute. In addition to this the KCl concentration of the extracted solution or strong liquor initially taken from the body of material was substantially higher where the body of material had been heated, thus adding to the actual rate of KCl extraction in addition to that obtained by the increased flow rate.

Our theory for this increased flow rate obtained by heating the material is that the hot solvent liquid as it passes through the upper layer of the body of salt mixture becomes saturated with KCl. As the saturated solution passes downwardly through the unheated body, it is cooled and KCl crystals are precipitated in the body of material, such crystals filling the interstices and impeding the flow therethrough.

Another important factor in the operation of the process contemplated by this invention has to do with the regulation of the flow of the mother liquor or solvent liquid which is delivered to the body of salt mixture. We have found that in order to obtain a clear solution, the flow must be regulated so that the body of material is always completely submerged thereby preventing channeling.

Other objects of the invention and further details in the procedure followed may be better understood by reference to the accompanying drawing which is chosen for illustrative purposes only, and in which the figure is a somewhat diagrammatic elevation partly in section showing one form of apparatus in which the process can be practiced.

Referring to the drawing, reference numeral 11 indicates a tank provided with insulation indicated at 12, such tank having a conical bottom 13 which terminates in an outlet connection 14 and has a cover 15 which is provided with an opening 16 through which the salt mixture is adapted to be charged in the tank.

The opening 16 is provided with a removable cover 17. Reference numeral 18 indicates a false bottom or perforated grid which is mounted in the tank at the upper edge of the conical bottom, such grid supporting a screen 19 upon which the body of material indicated at 20 is adapted to be supported. Reference numeral 21 indicates a steam connection, and reference numerals 22 and 23 indicate liquid outlet connections which are provided with valves 22' and 23'.

The outlet connection 22 is connected through suitable conduits with a plurality of storage tanks A, B, and C, indicated diagrammatically with a mother liquor tank C at 24. Reference numeral 25 indicates an inlet connection which is shown as being connected with a plurality of valved conduits 26, 27, and 28 through which extracting solutions of different concentrations are delivered into the treating tank 11.

The tank is shown as being provided with a gauge 30 and a valved vent 31 so that the steam pressure therein can be controlled, and, for the purpose of observing and controlling the liquid level within the tank, we provide means such as a float device indicated at 32.

In carrying out the process with apparatus of the type shown in the drawing, the tank 11 is first charged with the material 20, the quantity of material therein being such that it does not extend above the normal liquid level which is to be maintained. After the tank is charged, the cover 17 is clamped into place and steam is admitted through the steam pipe 21 and the valve 31 is controlled to vent the air and maintain the desired steam pressure in the tank 11. After the material has been subjected to the steaming action for a time sufficient to thoroughly heat the same (from twenty to forty-five minutes) the steam is shut off and a strong wash, coming from the tank A through the conduit 26, is delivered into the tank to raise the float to the desired point. We consider it preferable to permit the material to soak in this liquid for a short time to insure the removal of all air pockets after which the valve 22' is opened and the valves in the tank system 24 are set so that the solution coming from the tank 11 is delivered first into the tank A, which we term the strong wash tank. This first solution is slightly cloudy and for that reason it is permitted to flow into the tank A until it has clarified which consumes substantially one minute. When the outcoming solution clarifies, the valves in the tank system 24 are operated to direct the solution into the tank B which we term the strong liquor tank. In the meantime, additional hot solution is being delivered from the tank A into the tank 11 through the conduit 26. The solution delivered into the tank B is of the highest concentration or is saturated with potassium chloride and this solution is subsequently delivered to a cooler where the potassium chloride is precipitated and the mother liquor is returned to the tank C through conduit 28' for subsequent use in the process.

When the strong wash in tank A has been depleted to the desired extent, the valve in conduit 26 is closed and the valve in conduit 27 is opened so as to direct a weak wash solution from tank D through the conduit 27 into the tank 11. This is continued until the solution in tank D is depleted to the desired point, after which the valve in conduit 27 is closed and the valve in conduit 28 is opened to deliver mother liquor from tank C into the tank 11. In the meantime the specific gravity of the solution coming from the outlet conduit 22 is being observed at predetermined intervals and when the concentration of the solution with respect to KCl reaches a predetermined point below saturation, the valves in the conduit system 24 are set so as to direct the solution coming from the tank 11 into the strong wash tank A. Likewise when the concentration reaches another predetermined point below saturation, the solution is directed into the "weak wash" tank D. The solution is directed into tank D until the strength of the solution indicates that the extraction has been carried to completion.

As previously pointed out, all of the solution delivered into the tank 11 is substantially concentrated with respect to sodium chloride so that only a small amount, if any, additional sodium chloride is dissolved during the extraction. It follows, therefore, that the material which remains in the tank 11, is a mixture of sodium chloride and a gangue material. This material is removed by admitting water through a wash conduit 33 or a plurality of such conduits to dissolve the salt, the salt solution or brine being withdrawn through the valved conduit 23. The gangue material which will not pass through the screen on the grid is removed from time to time through a manhole indicated by reference numeral 34.

It is again emphasized that in the extraction of the potassium chloride it is important that the flow through the tank must be controlled by manipulation of the valve 22' and the valves on the conduits 26, 27, and 28 so that the body of material is constantly submerged beneath the level of the liquid. In other words, the material placed in the tank is of a quantity such that the top of the body of material occupies a predetermined point below the level that is to be maintained by the gauge or float 32, and then the flow of liquid is maintained so that the float does not drop below this predetermined position.

It is to be understood that, while we have herein described one preferred procedure followed in controlling the extracting operations with respect to the extracting solutions and have shown one preferred form of apparatus for practicing the process, certain variations both in the process and in the apparatus may be made without departing from the scope of this invention. It is also to be understood that, while we have shown no means for effecting the flow of liquid between the various tanks, nor means for heating the solvent liquids, suitable pumps and heaters may be provided for this purpose.

We claim as our invention:

1. The method of extracting potassium chloride from a crude salt and gangue mixture containing potassium chloride which includes: first, steaming a body of the crude material to thoroughly heat the same; completely covering the said body of material with a hot solvent liquid; and then admitting fresh liquid to the liquid covering the material from above the material and at the same time withdrawing concentrated liquid at a rate such that the said body of material is constantly covered by said liquid.

2. The method of extracting potassium chloride from a crude salt and gangue mixture containing potassium chloride which includes: placing a charge of said crude material in a vessel having a grid for supporting said charge of material;

admitting steam to said vessel to thoroughly heat said crude material; delivering a hot solvent liquid into said vessel to completely cover said material; and withdrawing the concentrated solution of potassium chloride from a point in the vessel below the grid at the same time introducing fresh hot solvent liquid into said vessel from a point above the body of material at a rate such that the material therein is always completely covered with liquid.

3. The method of extracting potassium chloride from a crude salt and gangue mixture containing potassium chloride which includes: first thoroughly heating a body of the crude material; completely covering the body of heated material with hot solvent liquid; and then admitting fresh hot solvent liquid to the liquid covering the material from above the material and at the same time withdrawing concentrated liquid from below the body of material at a rate such that the entire body of said material is constantly covered by said liquid.

THOMAS M. CRAMER.
GEORGE A. CONNELL.